United States Patent [19]

Reed

[11] 4,162,517
[45] Jul. 24, 1979

[54] TRIM ASSEMBLY FOR PANELBOARD
[75] Inventor: Ronald H. Reed, Versailles, Ky.
[73] Assignee: Square D Company, Park Ridge, Ill.
[21] Appl. No.: 842,773
[22] Filed: Oct. 17, 1977
[51] Int. Cl.$^2$ ............................................. H02B 1/04
[52] U.S. Cl. .................................. 361/358; 361/356;
220/355; 312/223; 361/360
[58] Field of Search ............... 361/331, 332, 356, 357,
361/358-363; 220/354, 355; 312/101, 223, 242

[56] References Cited
U.S. PATENT DOCUMENTS

| | | | |
|---|---|---|---|
| 3,339,124 | 8/1967 | Jorgensen | 361/356 |
| 3,436,602 | 4/1969 | Bassani | 361/358 |
| 3,777,224 | 12/1973 | Meacham | 361/360 |
| 3,946,283 | 3/1976 | Meacham | 361/360 |

Primary Examiner—Gerald P. Tolin
Attorney, Agent, or Firm—Norton Lesser; Larry I. Golden; Richard T. Guttman

[57] ABSTRACT

The following specification describes a double rabbet on the back of a panelboard cover for nestingly receiving a flange on the panelboard hopper. This permits proper cover adjustment irrespective of cabinet misalignment and prevents the deliberate insertion of an object past the hopper to possibly engage a live circuit at the interior assembly of the panelboard.

7 Claims, 8 Drawing Figures

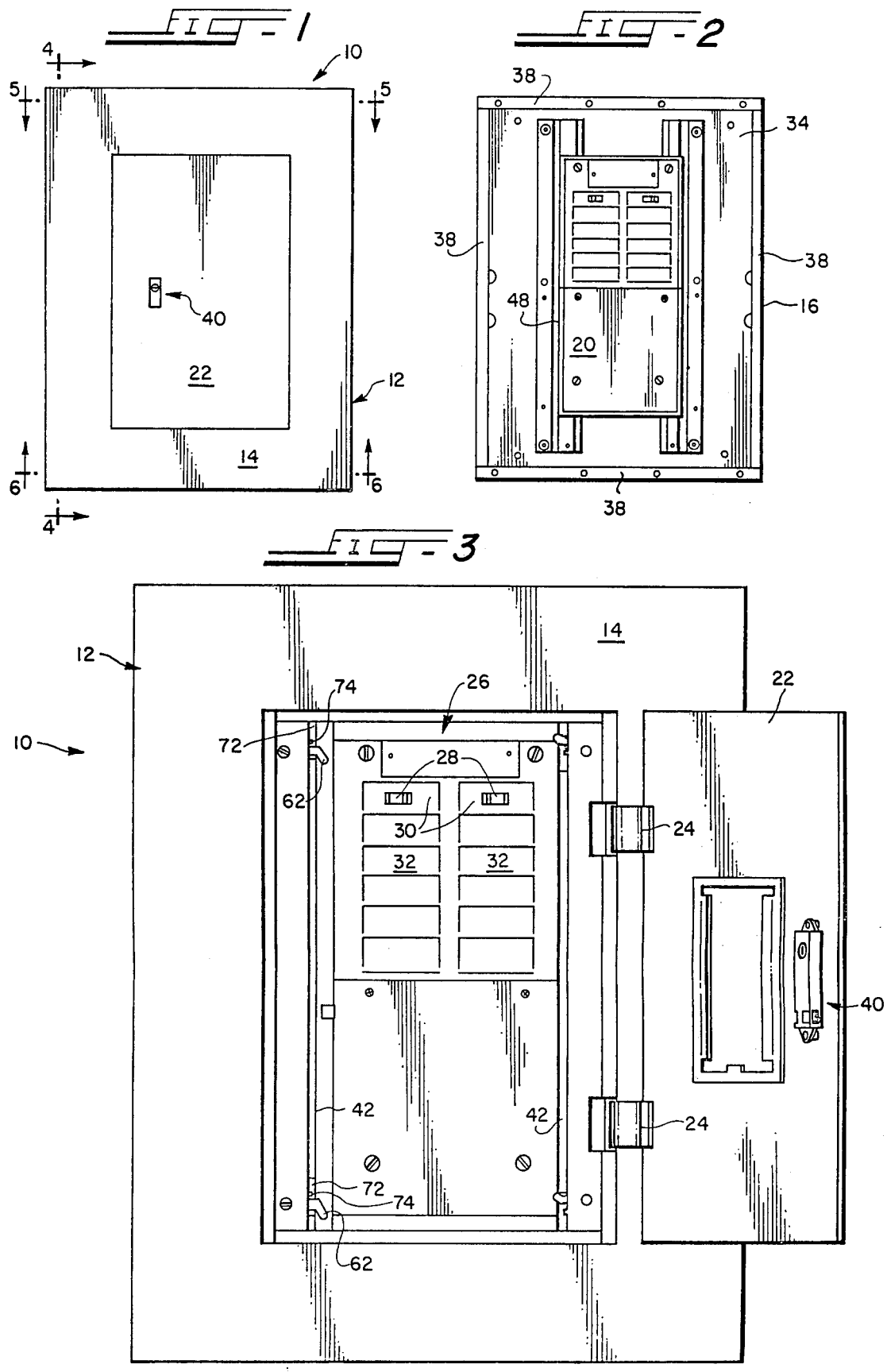

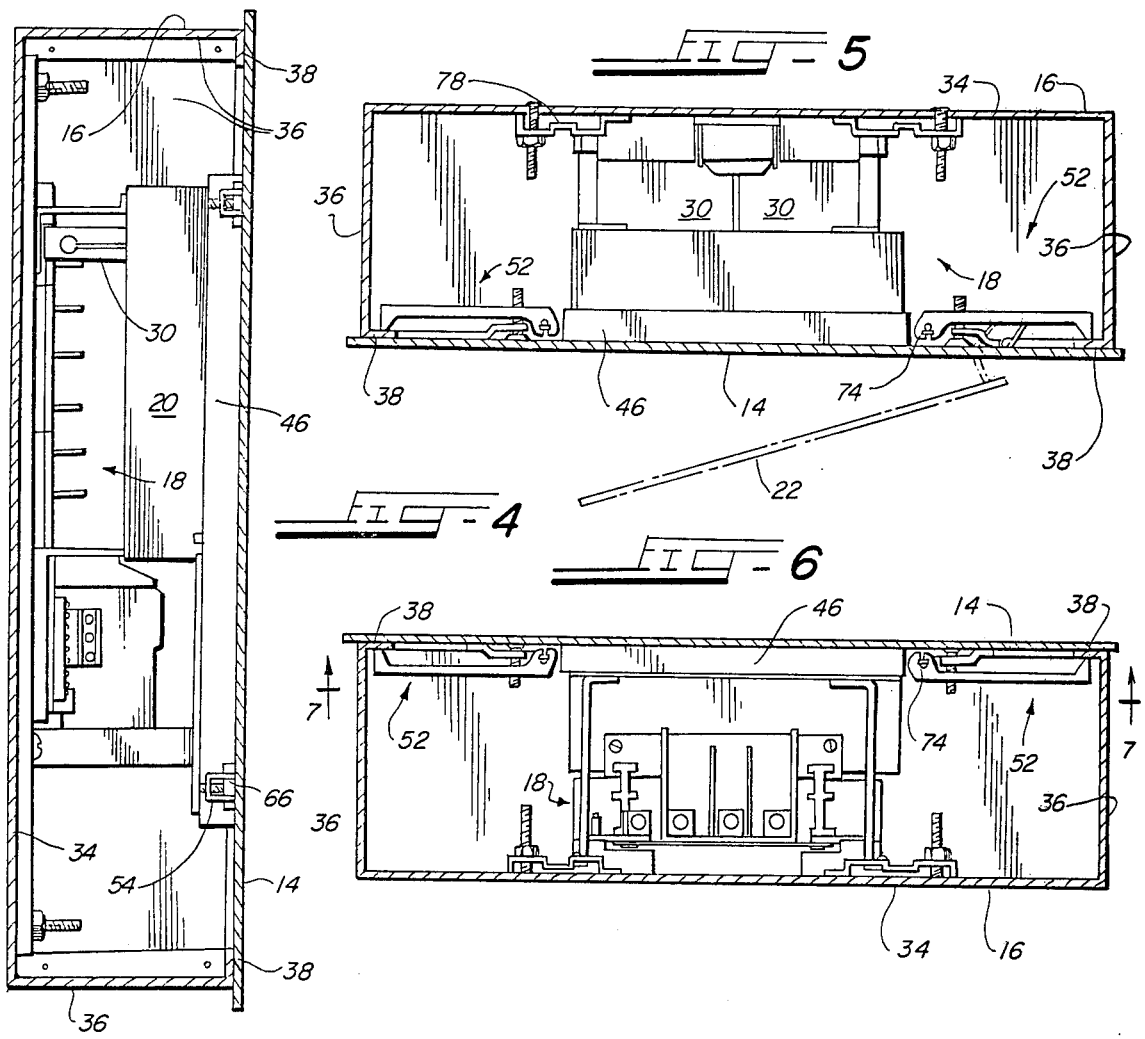

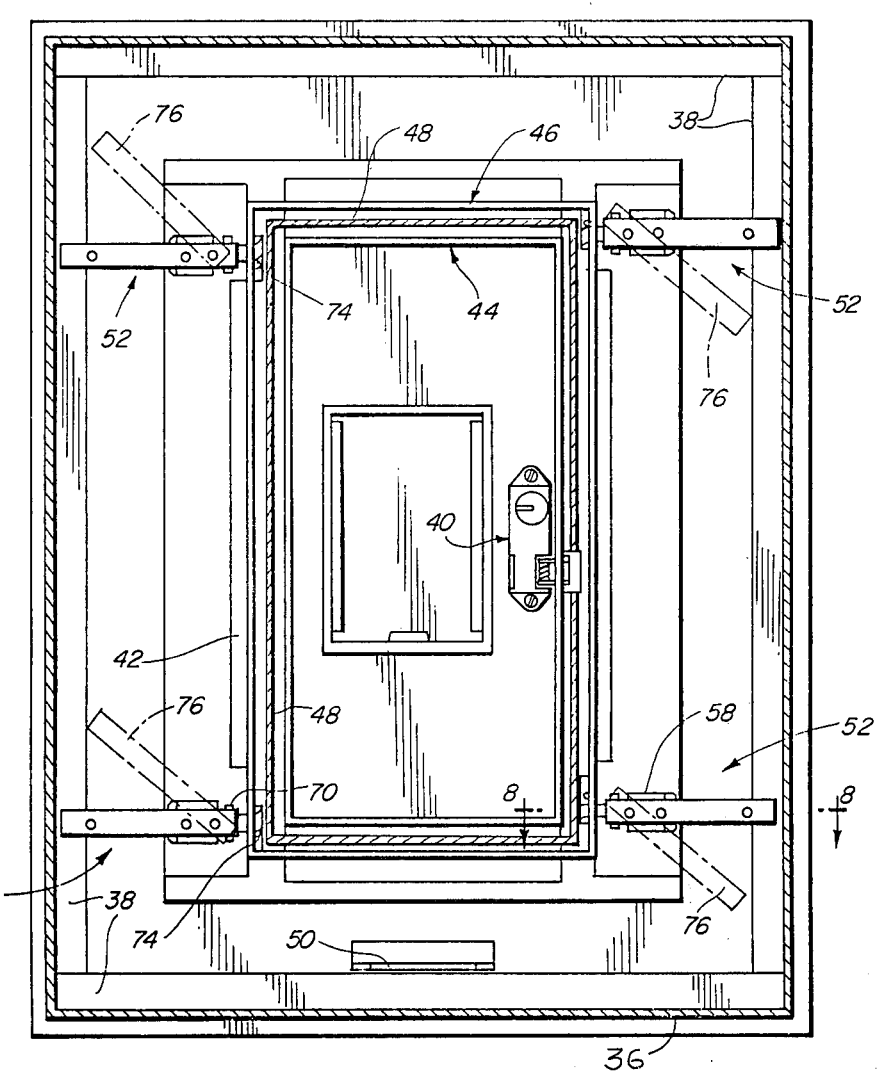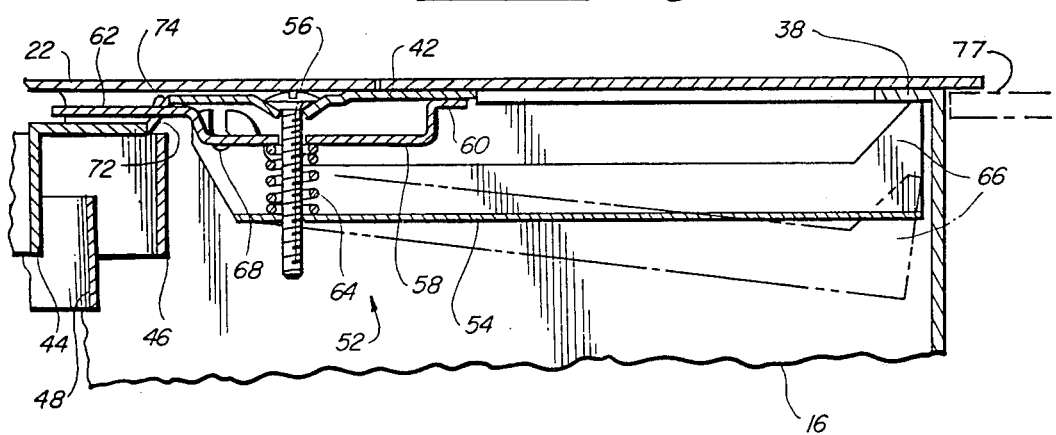

TRIM ASSEMBLY FOR PANELBOARD

FIELD OF THE INVENTION

This invention relates in general to panelboard trim assemblies and more particularly to an improved trim assembly for a panelboard.

SUMMARY OF THE PRIOR ART

In a typical panelboard, a cover and an interior trim or a hopper are secured to a cabinet for covering an interior assembly at which electrical connections are extended from bus bars through circuit breakers to desired locations. The handles of the circuit breakers extend through passages in the hopper or interior trim assembly and access to the handles is provided by a door on the cover. The cover is normally secured to the interior trim assembly or hopper.

In a new panelboard design such as disclosed in copending application Ser. No. 842,432 simultaneously herewith by Diersing, Schweikle and Stanback and an application Ser. No. 842,429 filed by Newsome and Brumfield, the cover is secured to side flanges of the cabinet or box in which the interior assembly is mounted. The cover thus extends past the edges of the hopper to engage an adjacent wall portion, when the cover is secured to the side flanges. If the cabinet is misaligned, the cover can also be misaligned and create an aesthetically unsatisfactory appearance. In addition when the door is open, access could be had to the interior assembly behind the hopper by snaking a finger or wire between the hopper periphery and the cover. This condition is subject to disapproval by Underwriters' Laboratory.

SUMMARY OF THE INVENTION

The present invention provides a double rabbet on the cover in surrounding relationship to the door opening for nestingly receiving a peripheral flange on the hopper. This enables the cover to be adjustably aligned with adjacent wall portions for aesthetic reasons irrespective of the cabinet position. Further when the door is open the double rabbet on the cover projecting toward the hopper and receiving the hopper flange therebetween requires a double or reverse bend in any wire or object attempted to be inserted between the cover and hopper before the wire can enter the space behind the hopper, thus effectively preventing such insertion.

It is therefore among the primary objects of the present invention to provide an improved trim assembly for a panelboard.

BRIEF DESCRIPTION OF THE DRAWINGS

FIG. 1 is a front elevational view of a panelboard assembly incorporating the principals of the present invention.

FIG. 2 is a front elevational view of the panelboard assembly shown in FIG. 1 with the cover removed.

FIG. 3 is a front elevational view of the panelboard assembly shown in FIG. 1 with the door in open position.

FIG. 4 is a sectional view taken along the line 4—4 in FIG. 1.

FIG. 5 is a sectional view taken along the line 5—5 in FIG. 1.

FIG. 6 is a sectional view taken along the line 6—6 in FIG. 1.

FIG. 7 is a sectional view taken along the line 7—7 in FIG. 6, and

FIG. 8 is a sectional view taken along the line 8—8 in FIG. 7.

DESCRIPTION OF THE PREFERRED EMBODIMENT

Referring now more specifically to the drawings, a panelboard assembly for use with 277/480 volt A.C., 3 phase, 4 wire systems or other systems is indicated in FIGS. 1 and 3 by the reference character 10. The panelboard assembly 10 includes an enclosure or housing 12 having a cover 14 overlapping a cabinet or box 16 seen in FIG. 2, which carries an interior assembly as described in the aforementioned Diersing application Ser. No. 842,432. The interior assembly is covered by an interior trim assembly or hopper 20. The trim assembly 20 in turn is hidden or overlapped by a door 22 supported by conventional hinge assemblies 24 on the cover 14 for movement between a closed position and an open position to provide access through opening 26 to the handles 28 of respective circuit breakers 30. The handles 28 project through respective passages in the interior trim assembly 20, which passages are closed by removable plates 32, if the corresponding circuit breaker position is not in use.

The cabinet or box 16 comprises a back wall 34 from which transverse top, bottom and side walls 36 project as best seen in FIGS. 4, 5 and 6. The back wall 34 is fixed or secured to a supporting wall or member in a conventional manner and the walls 36 are provided with conventional knockouts enabling the passage of appropriate wiring contained in the conduits or gutters secured to the box 16. Each of the walls 36 is also provided with an inwardly projecting lip or flange 38 parallel to and spaced from the back wall 34 as best seen in FIGS. 4, 5 and 6 to define an open end or opening permitting removal of the interior trim assembly 20 and connection of the conduit wiring when the cover 14 is removed.

The door 22 carries a spring biased retractable latch assembly 40 for engagement with a keeper formed on one of a plurality of flange walls 42 secured to the interior or rear surface of cover 14 to latch the door in a closed position. The flange walls 42 at their inner edge each have a rearwardly extending lip to define a rabbet 44 surrounding the perimeter of the cover opening as best seen in FIG. 7. Rabbet 44 is spaced inwardly from or encircled by a second rabbet 46 also surrounding the perimeter of the cover opening and formed on a flange wall secured to the rear surface of flange walls 42. The rabbets 44 and 46 serve to nestingly receive an outwardly projecting flange wall 48 on interior trim assembly 20 for resisting the deliberate attempt to insert a metal object behind the hopper 20 as disclosed in a copending application Ser. No. 842,429 filed by Brumfield Jr., et al. Rabbets 44 and 46 are spaced apart almost ¾" and each projects in excess of ¾" toward wall 48, while the flange or wall 48 projects in excess of ¾" toward the rabbets.

A cover flange 50 is secured to the rear surface of cover 14 and when rested on the lower horizontal lips 38 of box 16 serves to hold the weight of the cover 14, while the cover together with the door are secured to the box 16. The cover 14 secured to the box 16 by means of a plurality of spaced latch lever clamp assemblies 52 which capture a respective side or vertical lip 38 between the clamp assembly 52 and cover 14.

The latch lever clamp assemblies 52 as best seen in FIGS. 4–8 each includes a U-shaped elongate clamp 54. Each clamp 54 is secured to the cover 14 adjacent a respective corner of the door opening 26 by a respective screw 56. Each screw 56 passes through an enlarged hole in a side flange wall 42 and an enlarged hole in an offset planar portion of a lever 58 for threaded engagement with the back leg of the U-shaped clamp 54 adjacent one end of the clamp. The lever has spaced L-shaped legs 60 and 62 projecting from opposite ends of the planar portion and rotatably engaged with the rear surface of the side flanges 42. A coil spring 64 encircling screw 56 is located between the back leg of clamp 54 and the offset portion of lever 58 to bias the opposite or free end of the clamp side legs rearwardly from the cover 14, when the screw is loosened. The free end of the clamp side legs each have a projection 66 extending toward the cover 14 for engagement against the rear surface of the respective side lip or flanges 38 to secure the cover 14 to the box 16 when the screw 56 is tightened. The clamp side legs and projections 66 extend transverse to the general plane of lips 38 to ensure rigidity of the clamp and secure engagement of the cover with the box.

Each end of the clamp side legs adjacent the screw 56 are notched to define an enlarged arcuate recess 68 for receiving a respective ear 70 of the lever 58, which passes between the clamp side legs. The clamp 54 and lever 58 can therefor rotate together about the axis of screw 56 and clamp 54 together with screw 56 can pivot relative the general plane of the lever 58 and cover 14.

The leg 62 on the lever 58 project through a respective elongate opening or passage 72 formed in a rearward bend of the side flanges 42 and provides a visual indication of the angular position of the clamp 54. A detent 74 extends from each side flange 42 intermediate the ends of each passage 72 for engagement with leg 62, when moved between ends of the passage 72 and holds the clamp assemblies from alignment with a horizontal axis as seen in FIG. 7. When leg 62 moves past the detent 74 a metallic engagement may provide tactile and aural indication of the movement of the clamp 54 from an unlatched position indicated by dashed lines 76 to a latched or a locking position is provided, as the lever 58 is pivoted slightly against the bias of spring 64 to permit leg 62 to move past the detent 74.

As may be appreciated the box 16, when mounted on the support wall may be misaligned relative vertical and horizontal edges, lines or joints of adjacent walls such as 77 and in addition may be misaligned or tilted relative the planar surface of the adjacent walls.

To assemble the cover 14 to the box 16, each screw 56 is loosened, permitting each leg or tab 62 and the respective clamp to be manually rotated from alignment with a horizontal axis and the clamp projection 66 is spaced from cover 16. The detent 74 engaged with a respective tab 62 holds each clamp in the position indicated by broken lines 76 in FIG. 7 with the clamps spaced from the edges of cover 14 since the radial distance between screw 56 and clamp ends 66 is less then the distance to flanges 38 in the angular position indicated at 76. The cover may now be placed in position with rabbets 44 and 46 nestingly receiving the flange wall 48 of the interior trim assembly and flange 50 resting on the bottom lip 38. Each tab 62 may now be rotated to in turn rotate the respective lever 58 and the clamp 54 into a horizontal position with the projections 66 located behind and in alignment with the side or vertical lips 38 of the box 16. The straight line distance between the flanges and the screws is about $3\frac{3}{4}"$ and the distance between projections 66 and the screws is about $4\frac{1}{2}"$. As each tab rotates, the respective lever 58 pivots slightly against the bias of spring 64 to enable the tab 62 to pass detent 74.

With the double rabbet 44 and 46, the cover may be displaced relative box 16 within the limits of the spacing of the rabbets to ensure that the vertical and horizontal axis of the cover align with adjacent wall edges or joints. Cover rotation may be easily accomplished by lifting a corner of the cover, while the flange 48 rests on a rabbet portion or the cover may be shifted within the spacing of the rabbets to a desired position and in parallel relationship to adjacent walls. With the cover properly aligned the screws 58 are then tightened to draw the projections 66 on clamps 54 toward the cover 14 against the bias of springs 64. The projections 66 rigidly engage against the rear surface of the lips 38 for securing the cover 14 to the box 16 despite the relatively long distance between the flanges 38 and the screws 56.

It will be noted that the cabinet is substantially 20" wide and 26" long and that over 3" are provided on each side of the interior assembly for wiring. The cover is approximately $21\frac{1}{2}"$ wide and $27\frac{1}{2}"$ long so that the perimeter of the cover surrounds the perimeter of the cabinet. The cover thus overlaps the cabinet and may engage an adjacent wall portion such as 77 before engaging the side flanges 38.

If an adjacent wall portion indicated at 77 in FIG. 8 engages the overhang on cover 14 before the cover engages flanges 38, or the wall portion 77 overlaps flanges 38, the cover will be snugged against the adjacent wall portion and spaced from flanges 38. As much as a $\frac{3}{4}"$ spacing may thus be provided between flanges 38 and cover 14 to enable the cover to be tightly engaged against an adjacent wall 77 and in parallel relationship thereto despite the mounting of the box in non-planar relationship to the adjacent wall 77. This avoids adjustment in the position of the interior trim assembly to accommodate flush mounting of the cover to such adjacent wall portions.

The cover when secured to the side walls may thus be spaced by wall 77 from the hopper or interior trim, but the projecting length of the flange wall 48 received between the rabbets 44 and 46 accommodates this spacing, while preventing the insertion of an object behind the hopper.

The foregoing constitutes a description of an improved cover assembly for a high voltage high current panelboard, whose inventive concepts are believed set forth in the accompanying claims.

What is claimed is:

1. A panelboard trim assembly comprising:
   a cabinet having an open end, said cabinet also having a perimeter,
   a cabinet cover having a perimeter overlapping said perimeter of said cabinet to cover said open end of said cabinet, said cover having an opening aligned with said cabinet open end and providing access to said open end of said cabinet,
   means on said cover for clamping said cover to said cabinet,
   a door movably carried by said cover to close said cover opening in response to movement of said door to one position and uncover said cover opening in response to movement of said door to another position, a hopper carried by said cabinet and covered by said cabinet cover, said hopper being accessible through said cover opening in response to the movement of said door to said other position, a pair of spaced rabbets projecting from said cover toward said hopper in surrounding relationship to the perimeter of said cover opening, and a flange on said hopper projecting toward said cover in surrounding relationship to the perimeter of said cover opening and received intermediate said rabbets.

2. The assembly claimed in claim 1, in which said rabbets are spaced apart relative to said flange to guide said cover relative to said cabinet for aligning said perimeter of said cover with an edge of an adjacent room wall irrespective of a misalignment of said perimeter of said cabinet relative to said edge of said wall.

3. The assembly claimed in claim 2, in which said means for clamping said cover to said cabinet includes means for engaging one surface of said cover in overlapping planar relationship to said wall.

4. The improvement claimed in claim 1 in which said cover is spaced from said hopper, said cabinet carries said hopper and said flange projects toward said cover between said rabbets to prevent the introduction of an object through an open end of said cabinet.

5. The improvement claimed in claim 4 in which said means for clamping said cover to said cabinet includes means engaging said cabinet for moving said cover toward said cabinet to engage said wall spaced between said cabinet and said cover, said flange projects toward said rabbets and said rabbets toward said flange for a distance in excess of $\frac{3}{4}''$ to enable said flange to be received between said rabbets irrespective of a spacing of up to $1\frac{1}{2}''$ between said cover and said cabinet seated in a recess.

6. The improvement claimed in claim 4 in which the rabbets are spaced apart by a distance of less than $\frac{3}{4}''$ and greater than the thickness of said flange.

7. A panelboard trim assembly including a cabinet having a back wall and side walls received in a recess formed in a room wall and carrying an interior assembly for extending a plurality of electrical connections with said side walls projecting toward a surface of said room wall in which said recess receiving said cabinet is formed, the improvement comprising:

flanged ends on said side walls located in said recess adjacent a surface of said room wall, a cover extending past each side wall and secured to the flanged ends of said side walls in overlapping relationship to said side walls and to said surface of said room wall with said cover having an opening intermediate said side walls, a door pivotally carried on said cover with said door adapted to close said opening in one position and uncover said opening in another position, a pair of spaced apart rabbets carried by said cover with each rabbet surrounding said opening, a flange carried by said interior assembly surrounding said opening and spaced intermediate said rabbets and received therebetween to facilitate alignment of the edges of said cover with the perimeter of said room wall.

* * * * *